Oct. 27, 1959     L. L. KOROS     2,910,626
PROTECTIVE SYSTEM
Filed Jan. 18, 1956
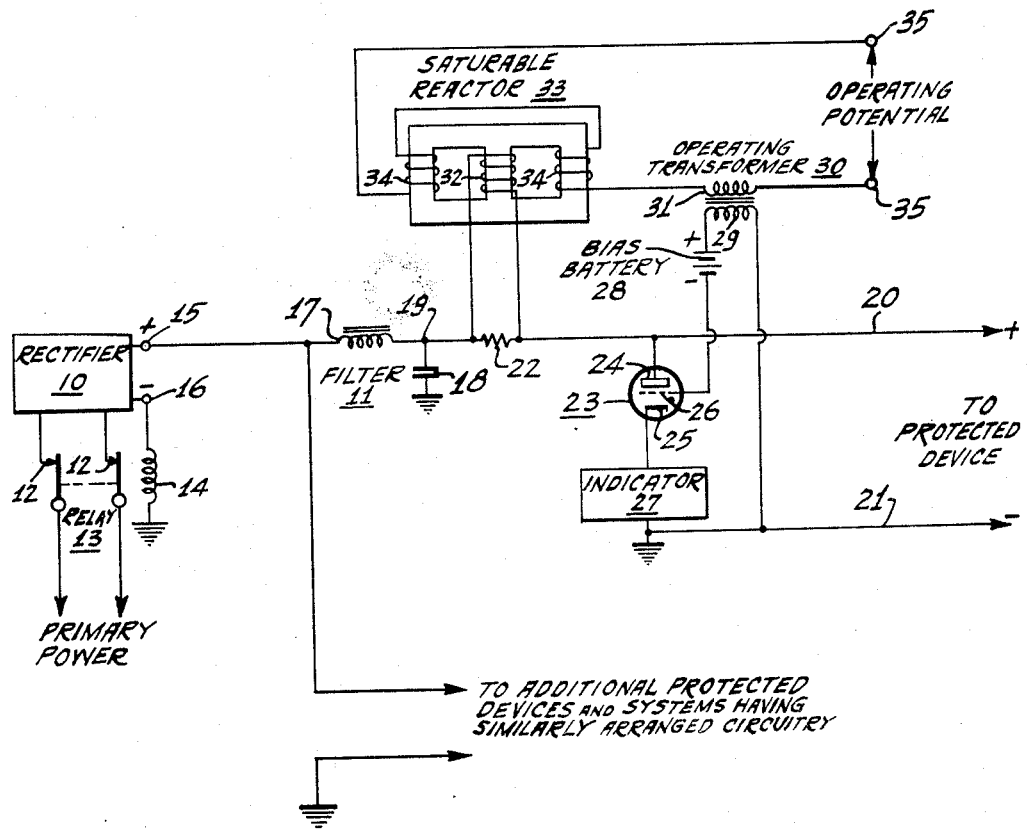
INVENTOR.
LESLIE L. KOROS
BY
Charles H. Brown
ATTORNEY

United States Patent Office 2,910,626
Patented Oct. 27, 1959

2,910,626

PROTECTIVE SYSTEM

Leslie L. Koros, Camden, N.J., assignor to Radio Corporation of America, a corporation of Delaware Application January 18, 1956, Serial No. 559,964

6 Claims. (Cl. 317—16)

The invention relates to protective systems for current utilizing devices, and particularly to protective systems which employ gas discharge devices for protecting the current utilizing device.

An object of the invention is to provide an improved protective system for current utilizing devices.

Another object of the invention is to provide a high-speed protective system for electron tubes that protects such tubes from excessive current, regardless of the rate at which such current rises.

Briefly, in accordance with the invention, the protective system comprises a short-circuiting device connected across the power source for the current utilizing device. The short-circuiting device is adapted to short-circuit the power source in response to an operating potential. A saturable reactor is connected in series with the power source and is adapted to produce the operating potential needed to operate the short-circuiting device in response to an excess current resulting from a fault.

The invention is explained in detail in connection with the accompanying drawing, in which the single figure shows the circuit diagram of a preferred embodiment of the invention.

In the drawing, the power source for the current utilizing device comprises a conventional rectifier 10 and filter 11. The rectifier 10 is supplied with alternating current from a suitable source of primary power. This primary power may be single phase alternating current, although it could be any type of current. The primary power is applied to the rectifier 10 through the normally closed contacts 12 of a relay 13. The contacts 12 are opened when the current flow through the relay coil 14 exceeds a predetermined magnitude. The relay coil 14 is connected between the negative output terminal 16 of the rectifier 10 and a point of reference potential, such as ground. The rectifier 10 converts the A.-C. primary power to D.-C. power in a conventional manner. This D.-C. power appears at the positive and negative output terminals 15, 16 respectively of the rectifier 10. The filter 11 is known as a choke-input filter and comprises a choke 17 and a capacitor 18. The filter 11 is connected between the positive output terminal 15 of the rectifier 10 and the output terminal 19 of the filter 11. The capacitor 18 is connected between the positive output terminal 19 of the filter 11 and the point of reference potential. The filtered D.-C. power appears between the positive output terminal 19 of the filter 11 and the point of reference potential. The filtered D.-C. power is applied over suitable leads 20, 21 to the current utilizing device which is to be protected. A shunt resistor 22 is connected between the positive lead 20 and the output terminal 19 of the filter 11. The other lead 21 is connected to the point of reference potential. This places the negative output terminal 16 of the rectifier 10 at a potential that is negative with respect to the reference potential. A short-circuiting device, such as a gas discharge device 23, is connected across or in parallel with the leads 20, 21. The gas discharge device 23 may be a thyratron having an anode 24, a cathode 25, and a control electrode 26. The anode 24 is connected to the positive lead 20 and the cathode 25 is connected to the point of reference potential through a suitable indicating device 27 that responds to a flow of current. The indicating device 27 may be of any suitable type designed to give a visual or an audible indication. The negative terminal of a suitable source of biasing potential, such as the bias battery 28, is connected to the control electrode 26. The output winding 29 of an operating transformer 30 is connected between the positive terminal of the bias battery 28 and the point of reference potential. The negative biasing potential applied to the control electrode 26 is of a magnitude that is sufficiently high to keep the device 23 cut off under normal operating conditions. An input winding 31 is coupled to the output winding 29 of the operating transformer 30.

The D.-C. winding 32 of a conventional three-legged saturable core reactor 33 is connected in parallel with the shunt resistor 22. However, if the D.-C. winding 32 of the saturable reactor 33 is capable of carrying the current required by the device to be protected, the shunt resistor 22 may be eliminated. If the saturable reactor 33 is symmetrical, each of the A.-C. windings 34 of the saturable reactor 33 should comprise an equal number of turns. The A.-C. windings 34 are connected to each other at one end and coupled to the D.-C. winding 32 through the core of the saturable reactor 33 so that no current is induced in the D.-C. winding 32 by current flowing in the A.-C. windings 34. However, changes in the magnitude of the current flowing in the D.-C. winding 32 cause a change in the inductance and impedance of the A.-C. windings 34. If the current flowing in the D.-C. winding 32 increases, the impedance of the A.-C. windings 34 decreases. If the current flowing in the D.-C. winding 32 decreases, the impedance of the A.-C. windings 34 increases. The A.-C. windings 34 may be connected in parallel instead of in series as shown, if the proper polarities between the various windings are maintained. Also, the functions of the A.-C. and D.-C. windings 34, 32 may be interchanged by interchanging their respective circuit connections. Terminals 35 are provided for applying a suitable alternating current operating potential to the input winding 31 of the operating transformer 30 and to the A.-C. windings 34. The input winding 31 of the operating transformer 30, the A.-C. windings 34 of the saturable reactor 33, and the operating potential terminals 35 are all connected in series. If desired, an inductance or a resistance can be used in place of the operating transformer 30 by connecting one end of the inductance or resistance to the A.-C. winding 34 and the positive terminal of the bias battery 28 and the other end to one terminal 35 and the point of reference potential.

Under normal conditions, with a suitable operating potential applied to the terminals 35 and with the protected device drawing normal current, the voltage appearing across the output winding 29 of the operating transformer 30 is less than the bias potential. Thus, the gas discharge device 23 is held cut off. If a fault develops to cause the protected device to draw more current than normal, the voltage across the shunt resistor 22 will increase. This increased voltage will cause an increased current flow in the D.-C. winding 32 of the saturable reactor 33. The impedance of the A.-C. windings 34 will decrease, and this decreased impedance will permit more current to flow through the input winding 31 of the operating transformer 30. When the current through the input winding 31 reaches a predetermined value, the voltage induced in the output winding 29 will be of sufficient magnitude to overcome the negative bias potential on the control electrode 26 and cause the gas discharge device 23 to fire or conduct. In this way, current is diverted from the protected device through the low impedance presented by the gas discharge device 23 when it is fired. The current flow through the gas discharge device 23 also flows through the indicator 27, which indicates that an abnormal condition exists in the system. The current flow through the gas discharge device 23 also flows through the relay coil 14. When the current flow through the relay coil 14 reaches a predetermined value, the relay contacts 12 will open, thereby cutting off the primary power. The relay 13 may be of the slow-response type so that a fault of short duration will not cause the primary power to be cut off but the protected device will be short-circuited by the gas discharge device 23.

In the design of a protective system in accordance with the invention, the D.-C. winding 32 of the saturable reactor 33 should have an inductive reactance that is low compared with the overall reactance of the circuit of the protected device. This provision ensures that the protection system acts quickly. The operating potential should be large enough so that when the impedance of the A.-C. windings 34 of the saturable reactor 33 is reduced, a voltage sufficiently large to cause the gas discharge device 23 to conduct will appear across the output winding 29 of the operating transformer 30. Since the operating potential is an alternating current, the speed of operation of the system varies proportionally with the frequency of the operating potential. If the protection system is to operate very quickly, the operating potential should have a high frequency, for example 10 to 500 kilocycles. For lower speeds of operation, ordinary 60 cycle alternating current can be used for the operating potential. The upper limit of the operating potential frequency is determined by the core losses of the saturable reactor 33. The lower limit is determined by the minimum permissible speed of operation.

A protective system in accordance with the invention has several advantages over previous systems. Prior systems using pulse transformers depend upon the rate at which the fault current increases with respect to time. If a fault current develops slowly, no firing voltage may be developed in such prior systems. In the present invention, the firing of the gas discharge device 23 depends upon the magnitude of the current flow to the protected device and not upon the rate the current increases with respect to time, in the event of a fault. Also, a number of the systems can be used to provide separate and individual protection to a plurality of protected devices all utilizing current from a single source, as indicated in the drawing. If a fault develops in one of the protected devices, that device will be safely protected and the fault indicated.

The invention claimed is:

1. An overload protective system for a D.-C. current utilizing device, comprising means for applying current to said device, a normally open short-circuiting device connected to said current applying means, operating means connected to said short-circuiting device, said operating means being adapted to cause said short-circuiting device to operate and short-circuit said current applying means in response to a predetermined voltage applied to said operating means, a saturable reactor having a D.-C. winding and an A.-C. winding coupled to said D.-C. winding, means connecting said D.-C. winding to be responsive to current flowing in said means for applying current to said current utilizing device, said A.-C. winding having an impedance that varies inversely with the current in said D.-C. winding, and means for applying an operating voltage to said A.-C. winding over a path including said operating means.

2. An overload protective system for a D.-C. current utilizing device, comprising means for applying current to said device, a normally open short-circuiting device connected to said current applying means, operating means connected to said short-circuiting device, said operating means having voltage input terminals and being adapted to cause said short-circuiting device to operate and short-circuit said current applying means in response to a predetermined voltage applied to said input terminals, a saturable reactor having a D.-C. winding connected in series with said current applying means whereby said D.-C. winding is responsive to current flowing in said means for applying current to said device, said saturable reactor having a pair of A.-C. windings coupled to said D.-C. winding, said A.-C. windings being connected to present an impedance that varies inversely with the current in said D.-C. winding, means for applying an operating voltage to said system, said operating voltage having a magnitude at least as great as the magnitude of said predetermined voltage, and means connecting said A.-C. windings, said input terminals, and said voltage applying means in series so that when the current in said current applying means exceeds a predetermined value, the impedance of said A.-C. windings is lowered and said predetermined voltage is applied to said input terminals, thereby causing said short-circuiting device to operate and short-circuit said current applying means.

3. An overload protective system for a device utilizing direct current, comprising means for applying direct current to said device, a normally cut off gas discharge tube connected to said current applying means, operating means connected to said gas discharge tube, said operating means having voltage input terminals and being adapted to cause said gas discharge tube to fire and short-circuit said current applying means in response to a predetermined voltage applied to said input terminals, a saturable reactor having a D.-C. winding connected in series with said current applying means and an A.-C. winding coupled to said D.-C. winding, said A.-C. winding having an impedance that varies inversely with the current in said D.-C. winding, means for applying an operating voltage to said system, said operating voltage having a magnitude at least as great as the magnitude of said predetermined voltage, and means connecting said A.-C. winding, said input terminals, and said voltage applying means in said series so that when the current in said current applying means exceeds a predetermined value, said A.-C. winding impedance is lowered and said predetermined voltage is applied to said input terminals, thereby causing said gas discharge tube to fire and short-circuit said current applying means.

4. An overload protective system for a D.-C. current utilizing device, comprising means for applying current to said device, a normally open short-circuiting device connected to said current applying means, an operating transformer having an output winding connected to said short-circuiting device and an input winding coupled to said output winding, said operating transformer being adapted to cause said short-circuiting device to operate and short-circuit said current applying means in response to a predetermined voltage applied to said input winding, a saturable reactor having a D.-C. winding connected in series with said current applying means whereby said D.-C. winding is responsive to current flowing in said means for applying current to said device, said saturable reactor having a pair of A.-C. windings coupled to said D.-C. winding, said A.-C. windings being connected so that current flow therethrough induces no current in said D.-C. winding and so that they have an impedance that varies inversely with the current flow in said D.-C. winding, means for applying an operating voltage to said system, said operating voltage having a magnitude at least as great as the magnitude of said predetermined voltage, and means connecting said A.-C. windings, said input winding, and said voltage applying means in series so that when the current in said current applying means exceeds a predetermined value, the impedance of said A.-C. windings is lowered and said predetermined voltage is applied to said input winding, thereby causing said short-circuiting device to operate and short circuit said current applying means.

5. An overload protective system for a device utilizing direct current, comprising means for applying direct current to said device, a gas discharge device having at least an anode, a cathode, and a control electrode, means connecting said anode and said cathode in parallel with said current applying means, biasing means connected between said control electrode and said cathode for holding said gas discharge device normally cut off, operating means connected in series with said biasing means, said operating means having voltage input terminals and being adapted to produce a firing voltage and cause said gas discharge device to fire and short-circuit and said current applying means in response to a predetermined voltage applied to said input terminals, a saturable reactor having a D.-C. winding connected in series with said current applying means and a pair of A.-C. windings coupled to said D.-C. winding, said A.-C. windings being connected so that current flow therethrough induces no current in said D.-C. winding and so that they have an impedance that varies inversely with the current flow in said D.-C. winding, means for applying an operating voltage to said system, said operating voltage having a magnitude at least as great as the magnitude of said predetermined voltage, and means connecting said A.-C. windings, said input terminals, and said voltage applying means in series so that when the current in said current applying means exceeds a predetermined value, the impedance of said A.-C. windings is lowered and said predetermined voltage is applied to said input terminals, thereby causing said gas discharge device to fire and short-circuit said current applying means.

6. An overload protective system for an electron discharge device utilizing direct current, comprising means for applying direct current to said device, a gas discharge device having at least an anode, a cathode, and a control electrode, means connecting said anode and said cathode in parallel with said current applying means, a source of biasing potential having positive and negative terminals, means connecting said negative terminal to said control electrode, an operating transformer having an output winding connected between said positive terminal and said cathode and having an input winding coupled to said output winding, said source of bias potential being of such a magnitude that said gas discharge device is normally held cut off when the current in said current applying means is normal and said operating transformer being adapted to produce a firing voltage and cause said gas discharge device to fire and short circuit said current applying means when a voltage having at least a predetermined magnitude is applied to said input winding, a saturable reactor having a D.-C. winding connected in series with said current applying means and a pair of A.-C. windings coupled to said D.-C. winding, said A.-C. windings being connected so that current flow therethrough induces no current in said D.-C. winding and so that they have an impedance that varies inversely with the current in said D.-C. winding, means for applying an A.-C. operating voltage to said system, said A.-C. operating voltage having a magnitude at least as great as said predetermined magnitude, and means connecting said A.-C. windings, said input winding, and said voltage applying means in series so that when the current in said current applying means exceeds a predetermined value, the impedance of said A.-C. windings is lowered and said predetermined voltage is applied to said input winding, thereby causing said gas discharge device to fire and short-circuit said current applying means.

References Cited in the file of this patent

UNITED STATES PATENTS

| | | |
|---|---|---|
| 1,138,625 | Burnham | May 11, 1915 |
| 2,435,572 | Bixby | Feb. 10, 1948 |
| 2,571,027 | Garner | Oct. 9, 1951 |
| 2,815,446 | Coombs | Dec. 3, 1957 |